United States Patent
Sato et al.

(10) Patent No.: US 12,175,685 B2
(45) Date of Patent: Dec. 24, 2024

(54) APPARATUS FOR NOTIFYING OBJECT BLUR, CONTROL METHOD THEREOF, AND STORAGE MEDIUM

(71) Applicant: CANON KABUSHIKI KAISHA, Tokyo (JP)

(72) Inventors: Akihiko Sato, Kanagawa (JP); Satoru Kobayashi, Tokyo (JP); Hitoshi Miyazawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 17/668,911

(22) Filed: Feb. 10, 2022

(65) Prior Publication Data
US 2022/0262014 A1 Aug. 18, 2022

(30) Foreign Application Priority Data

Feb. 15, 2021 (JP) ................... 2021-021951
Jan. 31, 2022 (JP) ................... 2022-013180

(51) Int. Cl.
*G06T 7/246* (2017.01)
*G06T 5/50* (2006.01)
(Continued)

(52) U.S. Cl.
CPC ............. *G06T 7/248* (2017.01); *G06T 5/50* (2013.01); *G06T 5/73* (2024.01); *G08B 3/10* (2013.01); *G08B 5/22* (2013.01)

(58) Field of Classification Search
CPC ............. G06T 7/248; G06T 5/50; G06T 5/73; G06T 2207/10016; G06T 2207/10024;
(Continued)

(56) References Cited

U.S. PATENT DOCUMENTS

2008/0151066 A1* 6/2008 Serikawa ............... H04N 23/68
  348/208.6
2020/0145583 A1* 5/2020 Shanmugam ........ G06V 10/764

FOREIGN PATENT DOCUMENTS

JP 2008172667 A 7/2008
JP 2016220024 A 12/2016

OTHER PUBLICATIONS

Dong Gong et al "From Motion Blur to Motion Flow: A Deep Learning Solution for Removing Heterogeneous Motion Blur", , Proceedings of the IEEE Conference on Computer Vision and Pattern Recognition (CVPR), 2017, pp. 2319-2328, . (Year: 2017).*

* cited by examiner

*Primary Examiner* — Mekonen T Bekele
(74) *Attorney, Agent, or Firm* — Canon U.S.A., Inc. IP Division

(57) ABSTRACT

An apparatus includes a capturing unit, a first motion information acquisition unit configured to acquire a first captured image with a first parameter and first motion information, a second motion information acquisition unit configured to acquire second motion information, a setting unit configured to set a second parameter, a third acquisition unit configured to acquire driving information for either the optical system or the capturing unit, an estimation unit configured to estimate estimated information by converting motion blur of the object in the first captured image into motion blur of the object in a second captured image obtained in a case where second capturing is performed with the second parameter, and a notification unit configured to notify the estimated information.

22 Claims, 9 Drawing Sheets

(51) Int. Cl.
*G06T 5/73* (2024.01)
*G08B 3/10* (2006.01)
*G08B 5/22* (2006.01)

(58) Field of Classification Search
CPC ........... G06T 2207/20021; G06T 2207/20201; G08B 3/10; G08B 5/22
See application file for complete search history.

PREPARATORY CAPTURED IMAGE
(FRAME M)

PREPARATORY CAPTURED IMAGE
(FRAME M+1)

COMPARISON BETWEEN MOTION VECTORS
(PREPARATORY CAPTURED IMAGE FIG. 5B)

PREPARATORY CAPTURED IMAGE
(FRAME M+1)

COMPARISON BETWEEN MOTION VECTORS
(PREPARATORY CAPTURED IMAGE FIG. 5C)

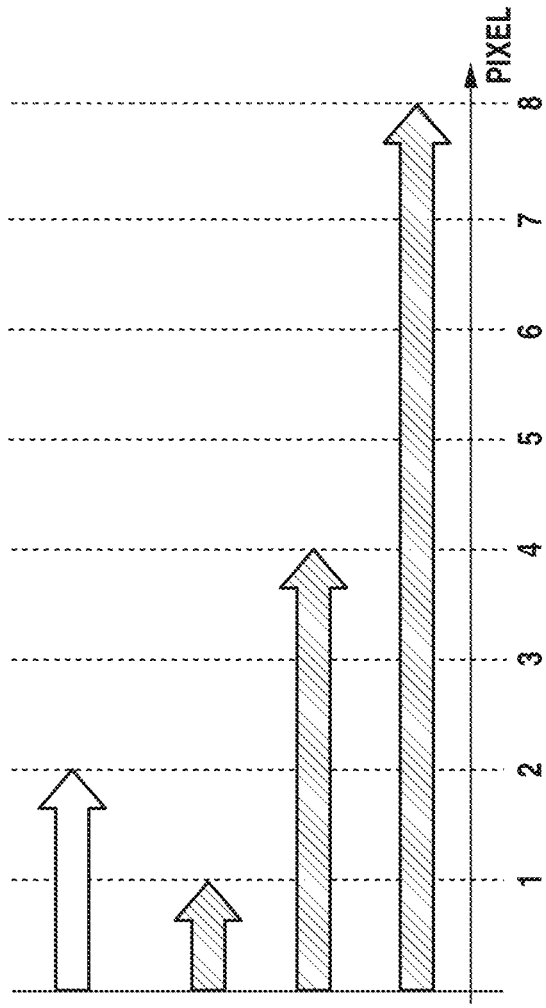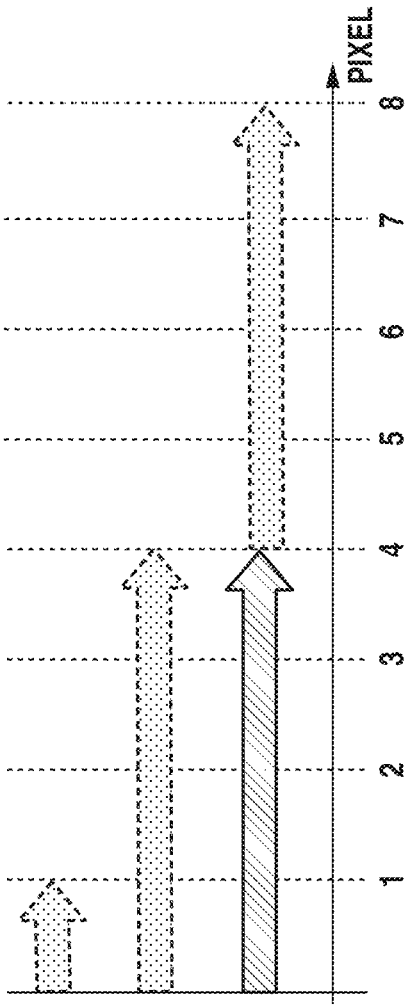

MOTION BLUR NOTIFICATION FRAME
(PREPARATORY CAPTURED IMAGE FIG. 5B)

MOTION BLUR NOTIFICATION FRAME
(PREPARATORY CAPTURED IMAGE FIG. 5C)

MOTION BLUR NOTIFICATION EDGE
(PREPARATORY CAPTURED IMAGE FIG. 5B)

MOTION BLUR NOTIFICATION EDGE
(PREPARATORY CAPTURED IMAGE FIG. 5C)

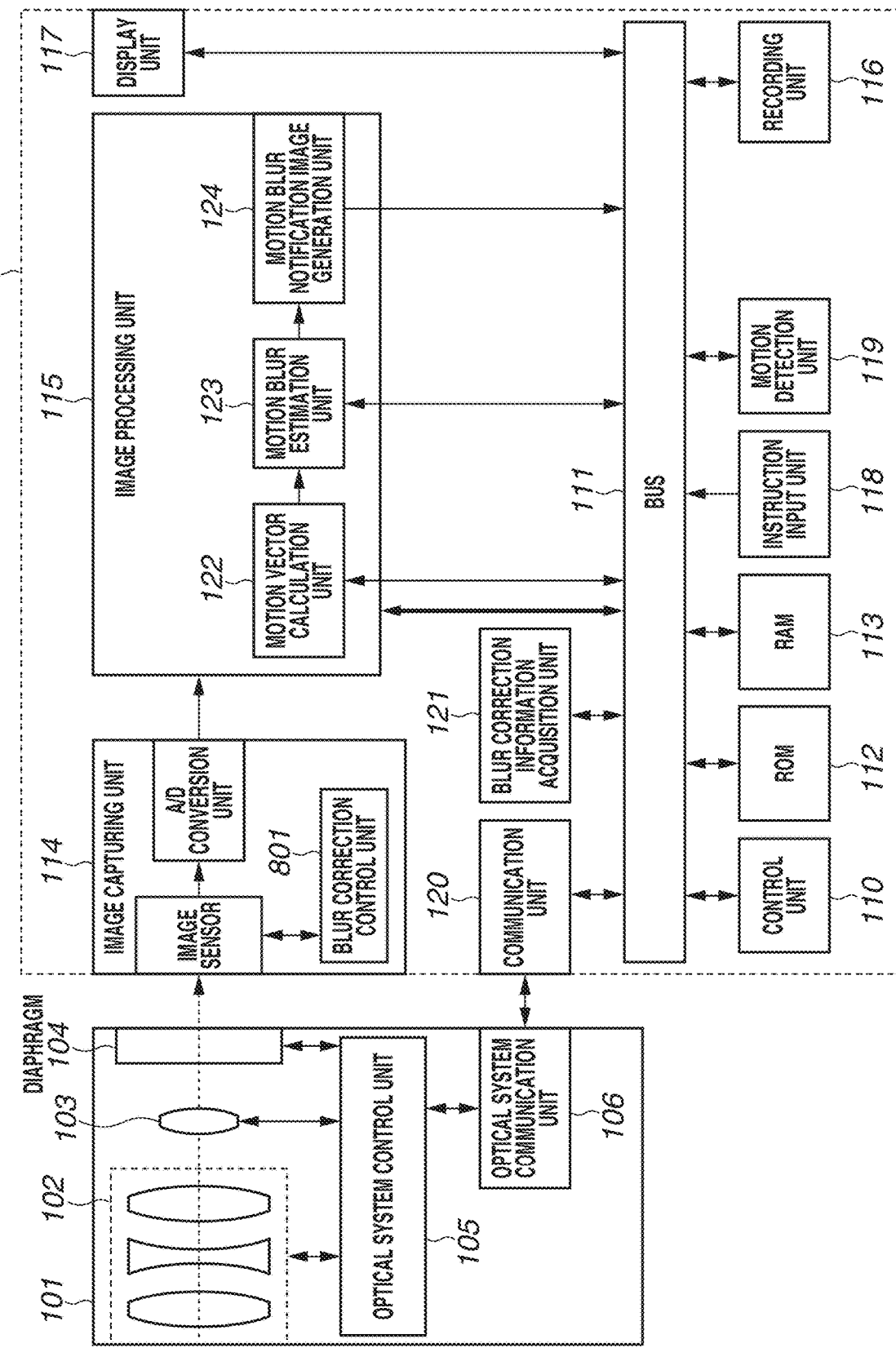

APPARATUS FOR NOTIFYING OBJECT
BLUR, CONTROL METHOD THEREOF, AND
STORAGE MEDIUM

BACKGROUND

Field of the Disclosure

The aspect of the embodiments relates to an image capturing apparatus, and more particularly, to a technique for notifying object blur in an image to be captured.

Description of the Related Art

To capture an image of a main moving object with a digital camera or the like without causing object blur, image is to be captured with an appropriate shutter speed, or is to be captured while an image capturing apparatus is being caused to track the moving object. For example, Japanese Patent Application Laid-Open No. 2008-172667 discusses a technique for detecting a region where blur has occurred between time-series images captured during preparatory image capturing and displaying the region in an emphasized manner so that a user can visually check the region where blur has occurred during preparatory image capturing. The term "preparatory image capturing" used herein refers to image capturing that is performed by the user to compose a shot and set image capturing conditions while viewing an image through an electronic viewfinder (EVF) or a rear-surface liquid crystal display (LCD) of the image capturing apparatus. Japanese Patent Application Laid-Open No. 2016-220024 discusses a technique in which a difference in angular velocity between a motion of an object and a motion of an image capturing apparatus is calculated based on motion information detected during preparatory image capturing, and a correction lens of an optical system and an image sensor of the image capturing apparatus are driven to reduce the difference in angular velocity, thus assisting object tracking in main image capturing.

However, in a case where the speeds and/or directions of the movements in partial regions in a main object region are different, it is difficult to determine whether a panning speed of the image capturing apparatus is appropriately settable for each partial region. The user can recognize the difference in the panning direction and speed between the object and the image capturing apparatus and the tracking range in which an optical blur correction control is performable in preparatory image capturing. However, it is difficult for the user to intuitively recognize the state of object blur in main image capturing.

SUMMARY OF THE DISCLOSURE

According to an aspect of the embodiments, an apparatus includes a capturing unit configured to capture an object image formed through an optical system, a first acquisition unit configured to acquire a first captured image and first information indicating a motion of an object in the first captured image, the first captured image being obtained by first capturing with a first parameter, a second acquisition unit configured to acquire second information indicating a motion of the apparatus in the first capturing, a setting unit configured to set a second parameter, a third acquisition unit configured to acquire driving information for either the optical system or the capturing unit, an estimation unit configured to estimate estimated information by converting motion blur of the object in the first captured image into motion blur of the object in a second captured image obtained in a case where second capturing is performed with the second parameter, and a notification unit configured to notify the estimated information.

According to another aspect of the embodiments, a control method for an apparatus including a capturing unit configured to capture an object image formed through an optical system includes acquiring, as a first acquiring, a first captured image and first information indicating a motion of an object in the first captured image, the first captured image being obtained by first capturing with a first parameter, acquiring, as a second acquiring, second information indicating a motion of the apparatus in the first image capturing setting a second parameter, acquiring driving information for either the optical system or the capturing unit, estimating estimated information by converting motion blur of the object in the first captured image into motion blur of the object in a second captured image obtained in a case where second capturing is performed with the second parameter, and notifying the estimated information.

Further features of the disclosure will become apparent from the following description of exemplary embodiments with reference to the attached drawings.

BRIEF DESCRIPTION OF THE DRAWINGS

FIGS. 6A and 6B each illustrate estimated motion blur in main image capturing.

FIG. 8 is a block diagram illustrating a second configuration example of the image capturing apparatus according to the exemplary embodiment.

DESCRIPTION OF THE EMBODIMENTS

Exemplary embodiments will be described below with reference to the accompanying drawings. In the following exemplary embodiments of the disclosure, motion blur is notified based on object motion information calculated based on an image during preparatory image capturing, motion information about an image capturing apparatus, and a motion blur correction amount.

Figure 1:
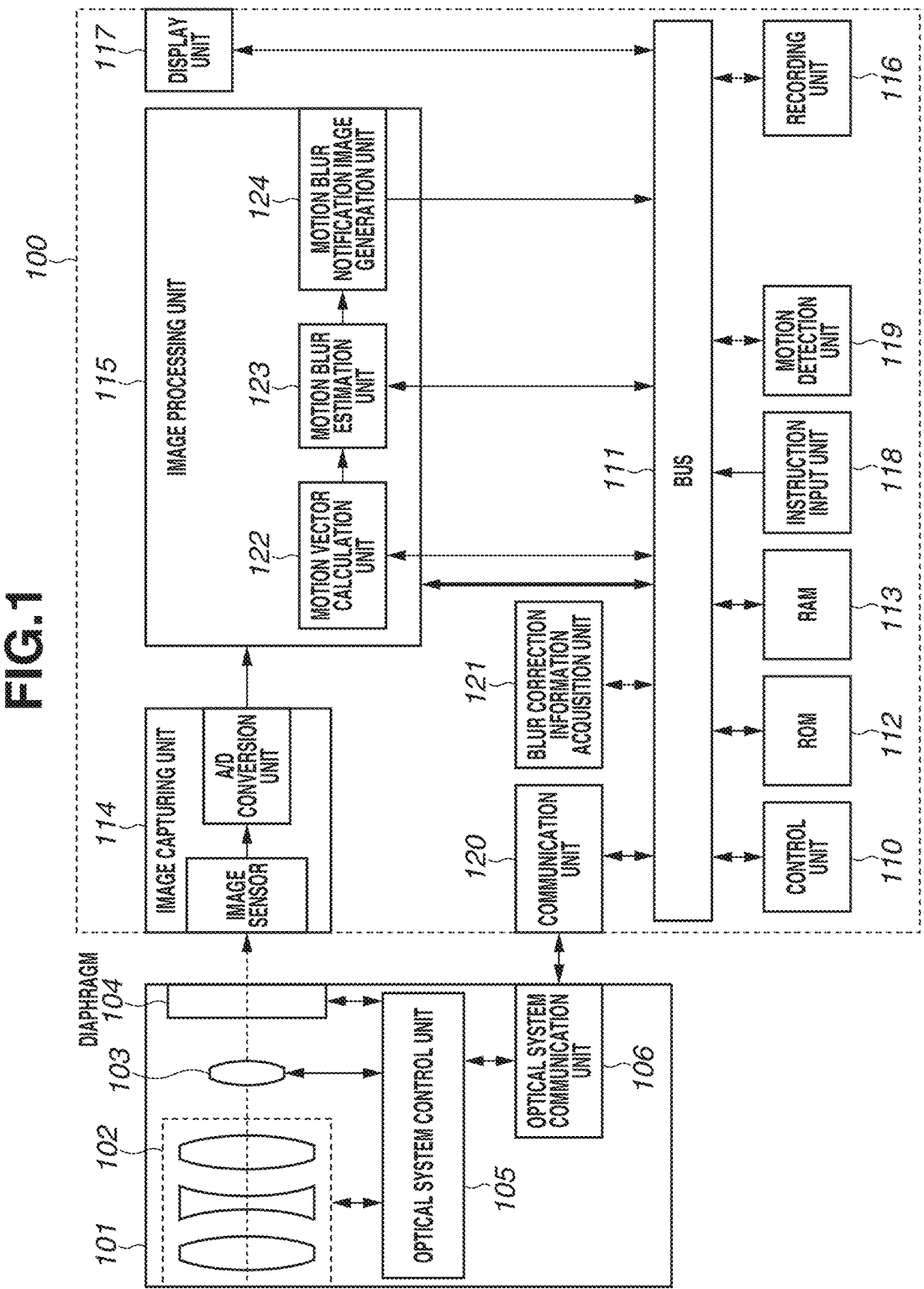
FIG. 1 is a block diagram illustrating a first configuration example of an image capturing apparatus according to an exemplary embodiment of the disclosure.

FIG. 1 is a block diagram illustrating a first configuration example of an image capturing apparatus according to an exemplary embodiment of the disclosure.

As illustrated in FIG. 1, an image capturing apparatus 100 is connected to an optical system 101 to be described below, and performs image capturing by forming an object image on an imaging plane formed by an image sensor of an image capturing unit 114 to be described below through the optical system 101.

The optical system 101 includes a lens unit 102, including a zoom lens and a focus lens, a correction lens 103, a diaphragm 104, an optical system control unit 105, and an optical system communication unit 106.

The optical system communication unit 106 exchanges information used for image capturing when the optical system communication unit 106 is connected to the image capturing apparatus 100. Specifically, the optical system communication unit 106 exchanges optical control information, such as a focal length of the optical system 101 and information about the diaphragm 104, and image capturing control information, such as an exposure time and an image capturing timing of the image capturing apparatus 100.

The optical system 101 according to the present exemplary embodiment includes an optical blur correction function. This optical blur correction function is implemented by the optical system control unit 105 controlling driving of the correction lens 103 in a direction vertical to an optical axis so as to prevent an imaging position on the imaging plane of the image sensor from being changed. This control method and processing performed by the image capturing apparatus 100 will be described below.

The image capturing apparatus 100 includes a control unit 110, a bus 111, a read-only memory (ROM) 112, a random access memory (RAM) 113, the image capturing unit 114, an image processing unit 115, a recording unit 116, a display unit 117, an instruction input unit 118, a motion detection unit 119, a communication unit 120, and a blur correction information acquisition unit 121.

The control unit 110 is, for example, a central processing unit (CPU). The control unit 110 reads out a control program for each block included in the image capturing apparatus 100 from the ROM 112 to be described below, and loads the control program into the RAM 113 to be described below, thus executing program.

Thus, the control unit 110 controls the operation of each block included in the image capturing apparatus 100 via the bus 111.

The ROM 112 is an electrically erasable and recordable nonvolatile memory. The ROM 112 stores not only operation programs for each block included in the image capturing apparatus 100, but also parameters and the like for the operation of each block.

The RAM 113 is a rewritable volatile memory. For example, the RAM 113 is used to load programs to be executed by the control unit 110 and the like, and to temporarily store data generated, for example, in the operation of each block included in the image capturing apparatus 100.

The image capturing unit 114 includes the image sensor, such as a charge-coupled device (CCD) sensor or a complementary metal oxide semiconductor (CMOS) sensor, and an analog-to-digital (A/D) conversion unit. The image capturing unit 114 photoelectrically converts an optical image formed on the imaging plane formed by the image sensor through the optical system 101 described above, and outputs an obtained analog signal to the A/D conversion unit. The A/D conversion unit converts the received analog image signal into digital image data. The digital image data output from the A/D conversion unit is temporarily stored in the RAM 113.

The image processing unit 115 applies various image processing, such as white balance adjustment, color interpolation, and gamma processing, to the image data stored in the RAM 113. The image processing unit 115 includes a motion vector calculation unit 122, a motion blur estimation unit 123, and a motion blur notification image generation unit 124 as described below. The image processing unit 115 generates a motion blur notification image that enables a user to easily check motion blur in images stored in the RAM 113. This processing will be described in detail below.

The recording unit 116 is a recording medium, such as a detachable memory card. The recording unit 116 records the image data processed by the image processing unit 115 as a recording image through the RAM 113.

The display unit 117 is a display device, such as a liquid crystal display (LCD). For example, the display unit 117 displays images stored in the RAM 113 and images recorded on the recording unit 116, and displays an operation user interface for receiving instructions from the user. The display unit 117 also displays images captured by the image capturing unit 114, for example, to compose a shot during preparatory image capturing, and the motion blur notification image generated by the image processing unit 115. The display unit 117 may include a plurality of display devices, such as an electronic viewfinder (EVF) and a rear-surface monitor provided on a photographer side (rear side). The display unit 117 may be configured to simultaneously output information to the plurality of display devices, or may be configured to selectively display information by switching screens.

The instruction input unit 118 is, for example, a touch panel, a button, or a mouse. The instruction input unit 118 is an interface for reflecting instructions from the user in the image capturing apparatus 100. For example, the exposure time for main image capturing and the focal length of the optical system 101 are set through the instruction input unit 118.

The motion detection unit 119 is, for example, a gyroscope sensor. The motion detection unit 119 periodically detects an angular velocity representing the movement amount and movement direction of the image capturing apparatus 100, converts the detected angular velocity into an electric signal, and outputs the electric signal to the RAM 113 and/or the image processing unit 115.

The communication unit 120 communicates with the optical system communication unit 106 included in the optical system 101 described above.

The blur correction information acquisition unit 121 acquires optical blur correction information from the optical system 101 through the communication unit 120 described above, and outputs the acquired optical blur correction information to the motion blur estimation unit 123. This optical blur correction information includes at least the driving amount of the correction lens 103. The optical blur correction information may also include information about a movable range of the correction lens 103 and parameters for calculating the driving amount of the correction lens 103.

The image capturing apparatus 100 performs preparatory image capturing (live view image capturing) for sequentially displaying analog image signals to be sequentially output from the image capturing unit 114 through the A/D conversion unit, the RAM 113, the image processing unit 115, and the display unit 117 under control of the control unit 110. During preparatory image capturing, the image capturing apparatus 100 can perform image capturing preparation processing, for example, to compose a shot for main image capturing assuming that, for example, information is recorded on a recording medium or information is output to an external apparatus, and to change image capturing parameters for main image capturing, such as an exposure time (Tv value), an aperture value (Av value) and International Organization for Standardization (ISO) sensitivity.

Next, the processing performed by the image capturing apparatus 100 according to the present exemplary embodiment will be described in detail with reference to a flowchart illustrated in FIG. 2. Each step in the flowchart is executed by the control unit 110 or each unit of the image capturing apparatus 100 and the optical system 101 in response to an instruction from the control unit 110.

The present exemplary embodiment assumes an image capturing scene captured by panning in which an image is captured by the image capturing apparatus 100 being caused to track a main moving object. Accordingly, in the present exemplary embodiment, auxiliary display is provided with an attention to on a motion blur state in a main object region, and there is no need for detection of motion blur and auxiliary display in a background region.

In a case where ideal panning is achieved, a movement speed of the main object completely matches a panning speed of the image capturing apparatus 100, and thus the magnitude of the motion vector for the main object region is zero. However, in practice, the panning speed of the image capturing apparatus 100 can be too high or too low compared with the movement speed of the main object, which causes motion blur for the main object.

Thus, control processing for notifying motion blur is performed for a region where the magnitude of the motion vector for the main object calculated by the motion vector calculation unit 122 is smaller than the magnitude of the motion vector of the image capturing apparatus 100 calculated by the motion detection unit 119.

To determine a target region for which the motion blur notification is to be performed, control processing for determining the main object by a known method and performing motion vector calculation processing and motion blur notification processing to be described below for the main object region may be performed.

Figure 2:
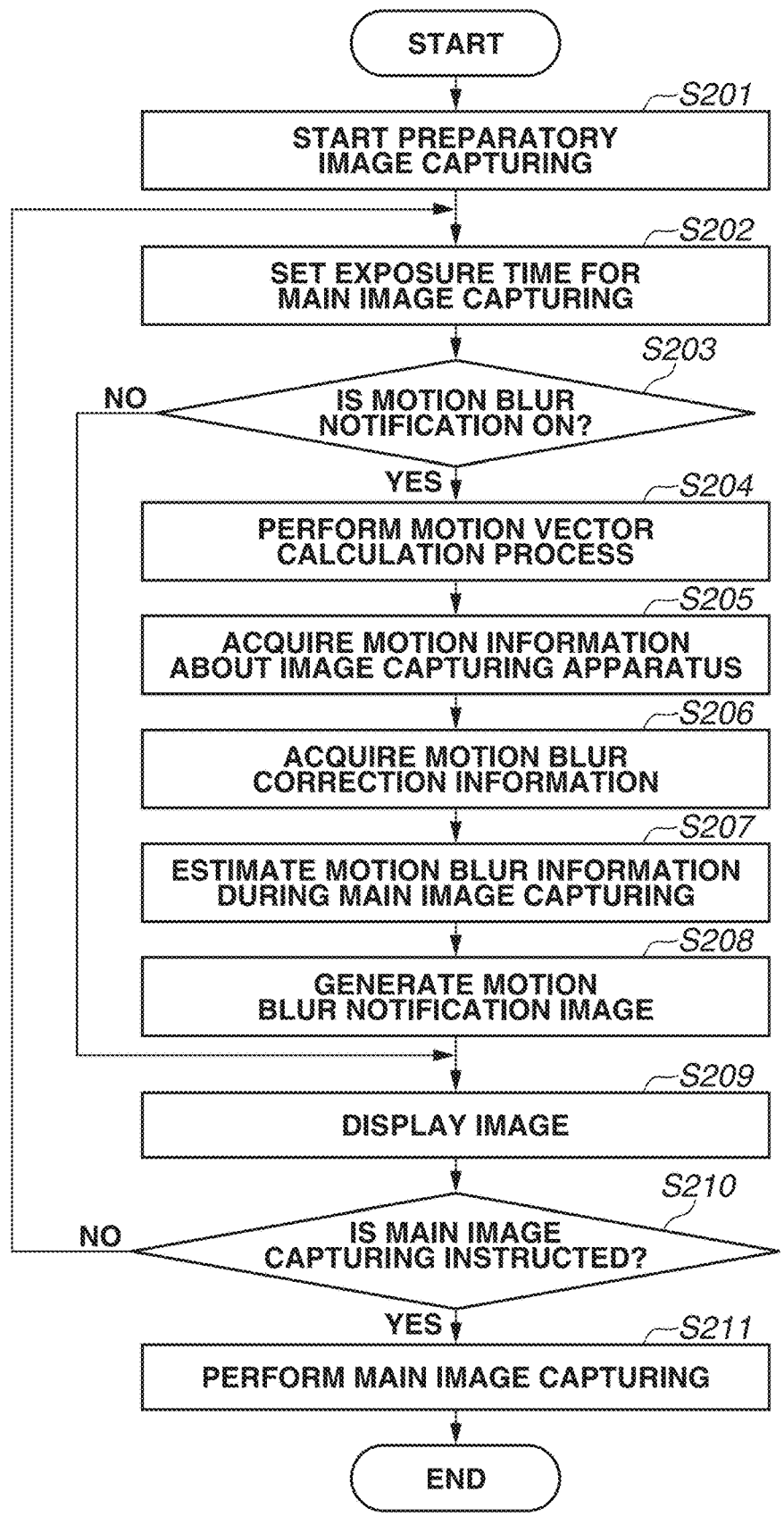
FIG. 2 is a flowchart illustrating a processing flow of the image capturing apparatus.

FIG. 2 is a flowchart illustrating the processing performed by the image capturing apparatus 100 according to the present exemplary embodiment. In step S201, the user powers on the image capturing apparatus 100 to start preparatory image capturing to, for example, compose a shot. During this preparatory image capturing period, the image capturing apparatus 100 sequentially captures images and displays the captured images on the display unit 117. This enables the user to perform processing for, for example, composing a shot while checking preparatory captured images which are sequentially displayed. A series of processes of steps S202 to S210 to be described below is performed during the preparatory image capturing period.

In step S202, the user uses the instruction input unit 118 to set the exposure time for main image capturing to an independent image capturing parameter. The exposure time for main image capturing may be automatically set by the control unit 110.

In step S203, the image capturing apparatus 100 determines whether the motion blur notification is ON or OFF. A setting for ON/OFF of the motion blur notification is made by the user on the instruction input unit 118. When ON/OFF of the motion blur notification is set once, the setting value is held.

If the motion blur notification is ON in step S203 (YES in step S203), the processing proceeds to step S204. If the motion blur notification is OFF (NO in step S203), the processing proceeds to step S209.

In step S204, in response to an instruction from the control unit 110, the motion vector calculation unit 122 calculates motion vector information about the main object in the preparatory captured image, and stores the calculated motion vector information in the RAM 113. This processing will be described in detail below.

In step S205, the control unit 110 acquires motion information about the image capturing apparatus 100 using the motion detection unit 119, and stores the acquired motion information in the RAM 113.

Initially, the motion detection unit 119 acquires angular velocity information for the image capturing apparatus 100, and calculates the motion vector for the image capturing apparatus 100 on the preparatory captured image.

Approximate transformations for converting the angular velocity into motion information on the image are represented by the following Expressions (1) and (2).

$$\text{MOV\_yaw} \approx \frac{f \tan\left(-\frac{\omega\_\text{yaw}}{fps}\right)}{pp} \quad (1)$$

$$\text{MOV\_pitch} \approx \frac{f \tan\left(-\frac{\omega\_\text{pitch}}{fps}\right)}{pp} \quad (2)$$

In Expressions (1) and (2), MOV_yaw represents a movement amount in a yaw direction, MOV_pitch represents a movement amount in a pitch direction, f represents a focal length, ω_yaw represents an angular velocity in the yaw direction, ω_pitch represents an angular velocity in the pitch direction, fps represents a frame rate for preparatory image capturing, and pp represents a pixel pitch of the image capturing unit 114. In the transformations indicated in Expressions (1) and (2), the movement amount on the imaging plane is calculated based on the movement angle and focal length at a time interval between preparatory captured images, and the movement amount (the number of pixels of movement) on the image is calculated by division using the pixel pitch. The calculated movement amount on the image is not the movement amount that varies from pixel to pixel, but is the movement amount that is uniformly set for all pixels.

Assuming that the movement amount in the yaw direction corresponds to the movement amount in a horizontal direction and the movement amount in the pitch direction corresponds to the movement amount in a vertical direction, the motion vector uniformly set for all pixels in the image capturing apparatus 100 is output to the RAM 113.

As another calculation method, the motion vector for the image capturing apparatus 100 may be calculated based on the motion vector for an object in the background region in the preparatory captured image. Specifically, assuming that the object in the background region is stationary, a motion vector obtained by reversing a starting point and an end point of the motion vector for the object calculated in the background region can be set as the motion vector for the image capturing apparatus 100.

Prior to description of processing in step S206, an operation for calculating a correction lens driving amount for main image capturing during preparatory image capturing using a motion blur correction function of the optical system 101 will be described.

During preparatory image capturing, two calculation processes are performed on driving information about the correction lens 103 for main image capturing. One of the calculation processes is calculation of a target angular velocity for matching the movement speed of the main object. The other of the calculation processes is calculation of the driving amount of the correction lens 103 for main image capturing and determination of the driving direction so as to eliminate the difference between the target angular velocity and the current angular velocity.

A method for calculating the target angular velocity will now be described. The optical system control unit 105 acquires angular velocity information about the image capturing apparatus 100 at any sample period T through the optical system communication unit 106. The stability of object tracking is determined based on the acquired angular velocity information, and the target angular velocity is calculated. For example, assume that a state where the ratio of change of the angular velocity during a predetermined period is within a predetermined ratio is determined to be a state where object tracking is stable. An average value of angular velocities during the predetermined period is calculated and the calculated average value is set to the target angular velocity. Instead of using the average value of angular velocities, a weighted average value on a time axis or a modal angular velocity that is most frequently set during the predetermined period may be calculated as the target angular velocity.

Next, the calculation of the correction lens driving amount of the correction lens 103 for main image capturing will be described. Approximate transformations for converting the angular velocity into the correction lens driving amount for main image capturing are represented by the following Expressions (3) and (4).

$$\mathrm{DRV\_yaw} \approx \frac{f \tan\left(-\frac{W_{yaw} - \omega_{yaw}}{T}\right)}{pp} * \mathrm{exp\_time} \quad (3)$$

$$\mathrm{DRV\_pitch} \approx \frac{f \tan\left(-\frac{W_{pitch} - \omega_{pitch}}{T}\right)}{pp} * \mathrm{exp\_time} \quad (4)$$

In Expressions (3) and (4), DRV_yaw represents the driving amount in the yaw direction, DRV_pitch represents the driving amount in the pitch direction, W_yaw represents the target angular velocity in the yaw direction, W_pitch represents the target angular velocity in the pitch direction, ω_yaw represents the current angular velocity in the yaw direction, ω_pitch represents the current angular velocity in the pitch direction, f represents the focal length, T represents any sampling period, pp represents the pixel pitch of the image capturing unit 114, and exp_time represents the exposure time for main image capturing.

As indicated by Expressions (3) and (4), for the correction lens driving amount for main image capturing, the difference between the target angular velocity and the current angular velocity is converted into motion information on the image and the exposure time for main image capturing is multiplied to thereby estimate the movement amount (blur amount) on the image during main image capturing. The driving direction is a direction in which the above-described difference between the angular velocities is cancelled out.

In a case where a maximum driving range for the correction lens 103 is provided, the maximum driving range may be compared with the above-described driving amount to determine the driving amount of the correction lens 103 for main image capturing. For example, in a case where the driving amount exceeds the maximum driving range, the driving amount may be set to the maximum driving range.

The driving amount may be calculated using an angular acceleration in addition to the angular velocity. For example, whether or not the object is moved at a constant acceleration may be determined, and the driving amount and control method for the correction lens 103 may be determined in view of the acceleration. The preparatory image capturing operation using the motion blur correction function of the optical system 101 has been described above.

Next, the processing of step S206 and subsequent steps for the image capturing apparatus 100 will be described.

In step S206, the control unit 110 acquires motion blur correction information for the optical system 101 from the blur correction information acquisition unit 121. The motion blur correction information includes at least a correction lens driving amount for main image capturing described above.

In a case where the optical system 101 does not include the motion blur correction function, or in a case where the motion blur correction function is in an OFF state, the motion blur correction information cannot be normally acquired. In such cases, estimation processing may be performed with the correction amount in the motion blur correction information set to zero in motion blur information estimation processing for main image capturing in step S207 to be described below, or the processing may be switched to estimation processing in which the motion blur correction information is not used.

ON/OFF of the motion blur correction function may be designated by, for example, the user issuing an instruction through the instruction input unit 118, or the control unit 110 setting the motion blur correction function depending on an image capturing mode.

ON/OFF of the motion blur correction function can also be designated depending on the movement direction of the image capturing apparatus 100. For example, the motion blur correction function may be turned on when the image capturing apparatus 100 moves in the horizontal direction, and the motion blur correction function may be turned off when the image capturing apparatus 100 moves in the vertical direction.

In step S207, in response to an instruction from the control unit 110, the motion blur estimation unit 123 estimates motion blur information for main image capturing based on the motion vector information in preparatory image capturing, the exposure time for main image capturing, the motion information about the image capturing apparatus 100, and the motion blur correction information. The estimation processing will be described in detail below with reference to FIGS. 6A and 6B.

In step S208, the motion blur notification image generation unit 124 generates the motion blur notification image by superimposing a motion blur notification plane on the preparatory captured image. The motion blur notification plane is generated using the motion blur information in main image capturing estimated in step S207. The motion blur notification plane generation processing will be described in detail below with reference to FIGS. 7A to 7G.

In step S209, the control unit 110 displays the preparatory captured image on the display unit 117. This display enables the user to observe the motion blur notification image displayed on the display unit 117 when the motion blur notification is ON, so that the user can check the motion blur state of the main object and the indication of the panning speed. If the panning speed of the image capturing apparatus 100 does not match the movement speed of the main object, the user issues a main image capturing instruction after adjusting the panning speed of the image capturing apparatus 100, thus appropriately performing panning.

In step S210, it is determined whether the main image capturing instruction is issued by the user through the instruction input unit 118. In step S210, if the main image capturing instruction is issued (YES in step S210), the processing proceeds to step S211. If the main image capturing instruction is not issued (NO in step S210), the processing returns to step S202.

In step S211, the image capturing apparatus 100 and the optical system 101 perform main image capturing processing in response to the instruction from the control unit 110. In response to receiving the main image capturing instruction, the optical system 101 drives the correction lens 103 based on the correction lens driving amount for main image capturing described above, thus implementing the blur correction function. The image capturing unit 114 acquires a main captured image exposed to light with the exposure time set in step S202 and performs predetermined image processing on the image, and then records the image as a main image capturing recording image on the recording unit 116. The outline of basic processing according to the present exemplary embodiment has been described above.

The calculation method for motion vector calculation processing in step S204 will be described in detail with reference to FIG. 3, FIG. 4, and FIGS. 5A to 5E.

Figure 3:
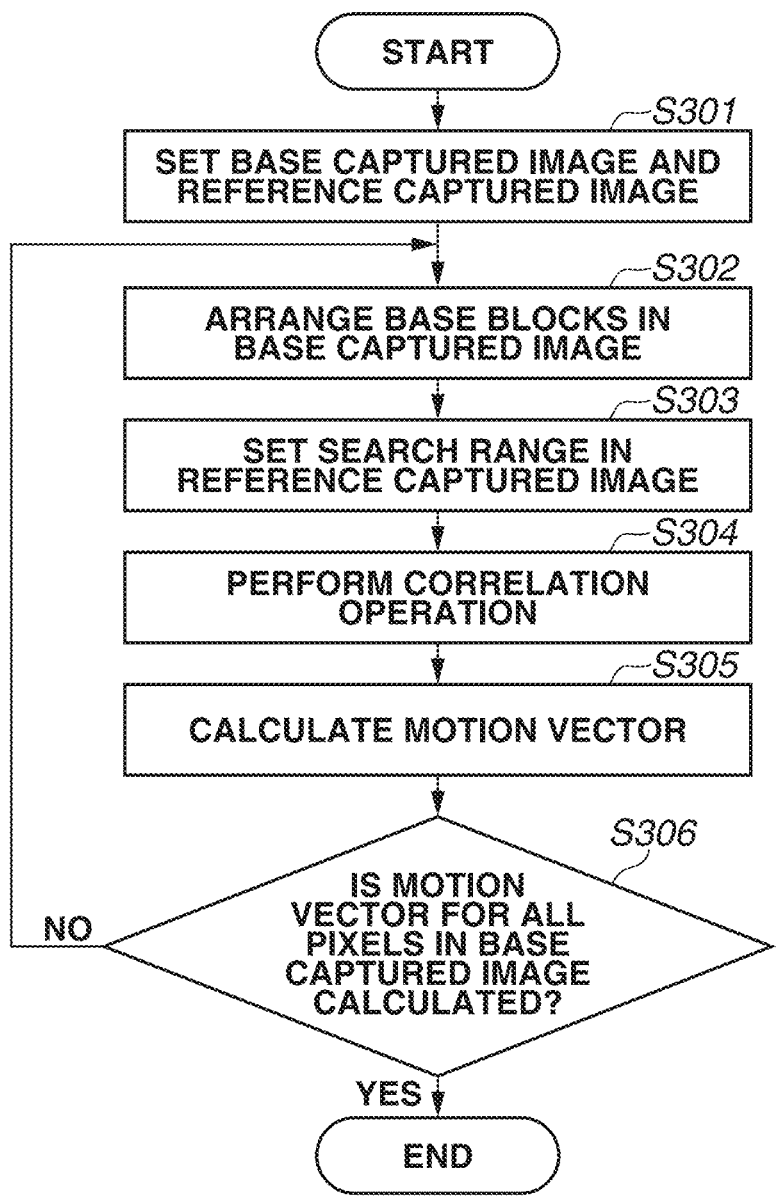
FIG. 3 is a flowchart illustrating a processing flow of a motion vector calculation unit.
Figure 4:
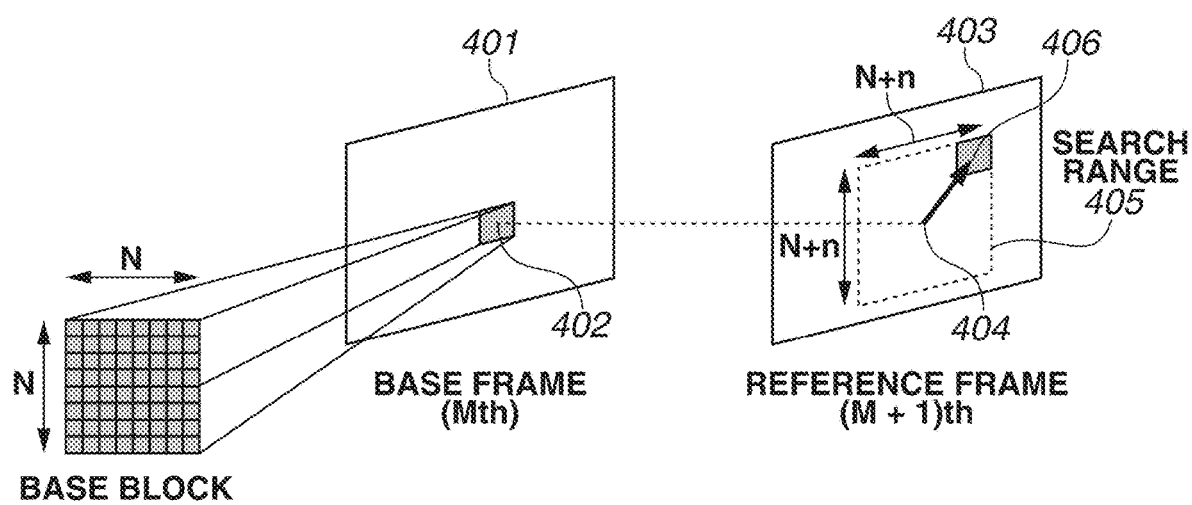
FIG. 4 illustrates a motion vector calculation method.
Figure 5A:
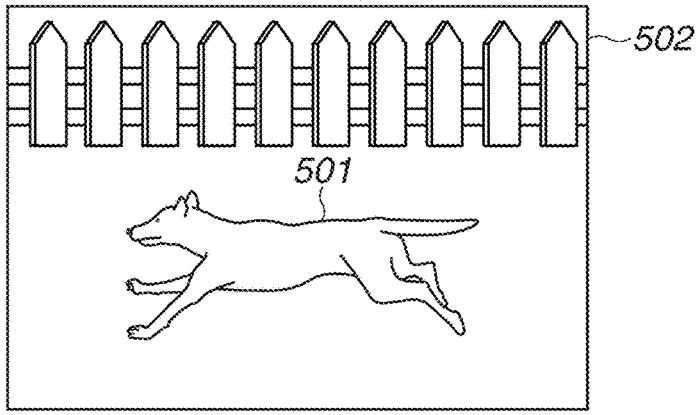
FIGS. 5A to 5C illustrate preparatory captured images.
Figure 5B:
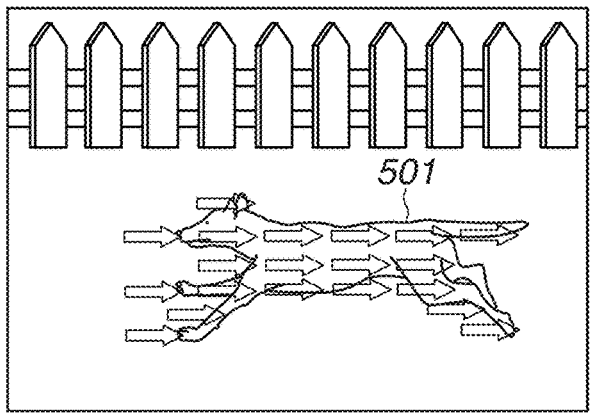
Figure 5D:
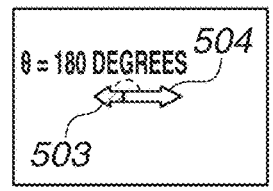
FIGS. 5D and 5E illustrate motion vectors.
Figure 5C:
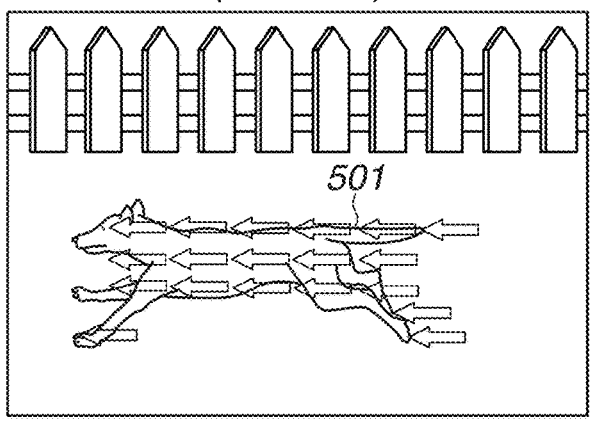
Figure 5E:
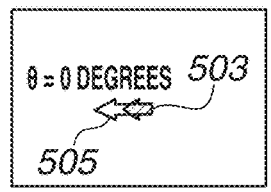

FIG. 3 is a flowchart illustrating motion vector calculation processing performed by the motion vector calculation unit 122. FIG. 4 illustrates a motion vector calculation method. FIGS. 5A to 5C illustrate preparatory captured images and FIGS. 5D and 5E illustrate motion vectors.

While the present exemplary embodiment illustrates a block matching method as an example of the motion vector calculation method, the motion vector calculation method is not limited to this example. For example, a gradient method may also be used.

In step S301, the motion vector calculation unit 122 receives two preparatory captured images that are temporally adjacent. The motion vector calculation unit 122 sets the preparatory captured image in an Mth frame to a base frame, and sets the preparatory captured image in an (M+1)th frame to a reference frame.

In step S302, the motion vector calculation unit 122 disposes a base block 402 of N×N pixels in a base frame 401 as illustrated in FIG. 4.

In step S303, the motion vector calculation unit 122 sets surrounding (N+n)×(N+n) pixels at coordinates 404 that match the central coordinates of the base block 402 in the base frame 401 to a search range 405 in a reference frame 403 as illustrated in FIG. 4.

In step S304, the motion vector calculation unit 122 performs a correlation operation between the base block 402 in the base frame 401 and a reference block 406 of N×N pixels at different coordinates in the search range 405 of the reference frame 403, thus calculating a correlation value. The correlation value is obtained through calculation based on the sum of interframe difference absolute values for the pixels in the base block 402 and the reference block 406. In other words, the coordinates at which the value of the sum of interframe difference absolute values is smallest correspond to the coordinates at which the correlation value is highest.

The correlation value calculation method is not limited to the method of obtaining the sum of interframe difference absolute values. For example, a method for calculating the correlation value based on an inter-frame difference sum of squares or a normal cross-correlation value may be used. In the example illustrated in FIG. 4, the reference block 406 indicates a highest correlation.

In step S305, the motion vector calculation unit 122 calculates the motion vector based on the coordinates of the reference block indicating the highest correlation value obtained in step S304. In the example illustrated in FIG. 4, the motion vector is obtained based on the central coordinates of the reference block 406 and the same coordinates 404 corresponding to the central coordinates of the base block 402 of the base frame 401 in the search range 405 of the reference frame 403. In other words, the direction and the distance between coordinates from the same coordinates 404 to the central coordinates of the reference block 406 are obtained as the motion vector.

In step S306, the motion vector calculation unit 122 determines whether the motion vector for all pixels in the base frame 401 is calculated. If the motion vector calculation unit 122 determines that the motion vector for all pixels is not calculated in step S306 (NO in step S306), the processing returns to step S302. In step S302, the base block 402 of N×N pixels is disposed in the base frame 401 (described above) centering on the pixel for which the motion vector has not been calculated, and the operations in steps S303 to S305 are performed in a manner similar to those described above. Specifically, the motion vector calculation unit 122 repeatedly performs the operations in steps S302 to S305 while moving the base block 402 illustrated in FIG. 4, thus calculating the motion vector for all pixels in the base frame 401.

FIGS. 5B and 5C illustrate examples of thus calculated motion vectors. FIG. 5B illustrates a case where the motion vector is directed rightward, and FIG. 5C illustrates a case where the motion vector is directed leftward.

FIG. 5B illustrates a dog 501 as a main object, and the dog 501 is shifted rightward as compared with FIG. 5A. This corresponds to a case where the panning speed of the image capturing apparatus 100 is lower than an appropriate panning speed that matches the movement speed of the main object. In this case, as illustrated in FIG. 5D, an image capturing apparatus motion vector 503 and an object motion vector 504 are in opposite directions (absolute value of an angle θ is larger than 90 degrees). FIG. 5C illustrates that the dog 501, which is the main object, is shifted leftward as compared with FIG. 5A. This corresponds to the case where the panning speed of the image capturing apparatus 100 is lower than the appropriate panning speed that matches the movement speed of the main object. In this case, as illustrated in FIG. 5E, the image capturing apparatus motion vector 503 and an object motion vector 505 are in the same direction (absolute value of the angle θ is smaller than 90 degrees). While FIGS. 5D and 5E illustrate a case where the motion vectors are in the same direction, the direction of each motion vectors may vary from region to region. The motion vector calculation unit 122 may calculate the motion vector every predetermined number of pixels, instead of calculating the motion vector for all pixels. The motion vector calculation processing performed by the motion vector calculation unit 122 has been described above.

Next, a motion blur estimation method for main image capturing in step S207 will be described in detail with reference to FIGS. 6A and 6B. FIGS. 6A and 6B each illustrate the motion vector in preparatory image capturing and estimated motion blur as motion blur estimated in main image capturing. In the following description, a time interval between images in preparatory image capturing is set to 1/60 seconds, and the exposure time for main image capturing is set to 1/120 seconds, 1/30 seconds, and 1/15 seconds, as examples in FIGS. 6A and 6B.

The motion blur estimation unit 123 estimates the motion vector for each pixel as motion blur during main image capturing based on transformations indicated in the following Expressions (5), (6), and (7).

$$CNV\_GAIN = EXP\_TIME/INT\_TIME \quad (5)$$

$$CNV\_PRE\_BLUR = VEC\_LEN \times CNV\_GAIN \quad (6)$$

$$CNV\_BLUR = CONV\_PRE\_BLUR - ADJ\_BLUR \quad (7)$$

In Expression (5), CNV_GAIN represents an estimated gain for converting the motion vector for preparatory image capturing into the motion vector for main image capturing, EXP_TIME represents the exposure time for main image capturing, and INT_TIME represents the time interval between images in preparatory image capturing. In Expression (6), CNV_PRE_BLUR represents estimated motion blur before blur correction in main image capturing, and VEC_LEN represents the length of the motion vector in preparatory image capturing. In Expression (7), CNV_BLUR represents estimated motion blur in main image capturing, and ADJ_BLUR represents a motion blur correction amount in the motion blur correction function.

In Expression (5), the estimated gain is calculated by dividing the exposure time for main image capturing by the time interval between images in preparatory image capturing. In Expression (6), the estimated motion blur before blur correction in main image capturing is estimated by multiplying the estimated gain by the length of the motion vector.

Specifically, as illustrated in FIG. 6A, in a case where the length of the motion vector in preparatory image capturing corresponds to two pixels, the estimated motion blur when the exposure time for main image capturing is 1/120 seconds corresponds to one pixel since the estimated gain is halved (½) as indicated in Expressions (5) and (6). The estimated motion blur when the exposure time for main image capturing is 1/30 seconds corresponds to four pixels since the estimated gain is doubled. The estimated motion blur when the exposure time for main image capturing is 1/15 seconds corresponds to eight pixels since the estimated gain is quadrupled.

By using Expression (7), the motion blur correction amount is subtracted from the estimated motion blur before blur correction in main image capturing, thus appropriately estimating the estimated motion blur in main image capturing even in a situation where the optical blur correction function is enabled.

For example, in a case where the maximum movable range for the correction lens 103 corresponds to four pixels, the estimated motion blur in main image capturing corresponds to zero pixels when the exposure time for main image capturing is 1/120 seconds or 1/30 seconds, and the estimated motion blur in main image capturing corresponds to four pixels when the exposure time for main image capturing is 1/15 seconds as illustrated in FIG. 6B. The estimated motion blur estimation processing in main image capturing performed by the motion blur estimation unit 123 has been described above.

Next, a method for generating the motion blur notification image by the motion blur notification image generation unit 124 in step S208 will be described in detail with reference to FIGS. 7A to 7G. FIGS. 7A to 7G each illustrate a display example of the motion blur notification image displayed on the display unit 117.

Figure 7A:
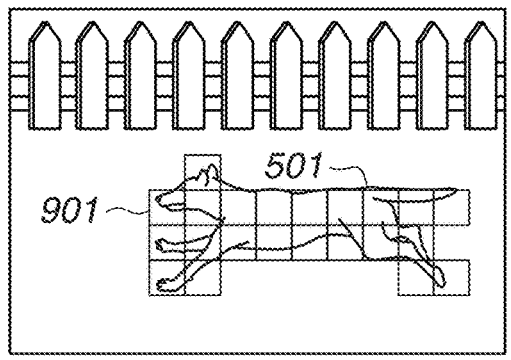
FIGS. 7A to 7G each illustrate a motion blur notification method according to the exemplary embodiment.
Figure 7B:
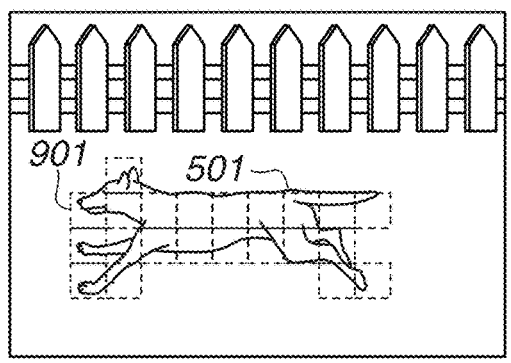

A first display example where motion blur is notified by displaying a motion blur frame will be described with reference to FIGS. 7A and 7B. FIGS. 7A and 7B correspond to FIGS. 5B and 5C, respectively.

A method for generating the motion blur notification image by displaying a frame will now be described. The motion blur notification image generation unit 124 compares the number of pixels corresponding to the estimated motion blur indicating that the panning speed is higher than the appropriate panning speed with the number of pixels corresponding to the estimated motion blur indicating that the panning speed is lower than the appropriate panning speed among the pixels included in each divided region based on the result of step S305. The motion blur notification image generation unit 124 determines the state of motion blur in which the number of pixels is larger to be the state of object motion blur in the divided region, and generates a motion blur frame 901 based on the result. In other words, the display mode for the motion blur frame is changed depending on whether the panning speed is higher or lower than the appropriate panning speed. The motion blur notification image generation unit 124 generates the motion blur frame 901 as the motion blur notification plane for a region where the size of the estimated motion blur described above exceeds a moving object blur display threshold, and superimposes the motion blur notification plane on the preparatory captured image, thus generating motion blur notification images as illustrated in FIGS. 7A and 7B.

In the present exemplary embodiment, the moving object blur display threshold is more than or equal to 0 pixels. The moving object blur display threshold may be set to any value depending on the degree of tolerance of blur in the recording image during main image capturing. Thus, the moving object blur display threshold may be appropriately changed depending on a user instruction, a recording resolution, or the like.

With this configuration, when the panning speed is higher (lower) than the appropriate panning speed as illustrated in FIGS. 7A and 7B, the motion blur frame is displayed as a solid line (dotted line), thus enabling the user to recognize whether the current panning speed is too high or too low.

Figure 7C:
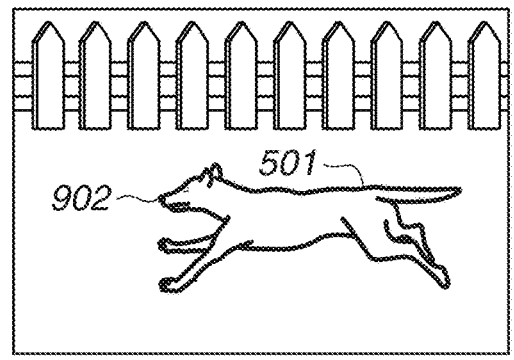
Figure 7D:
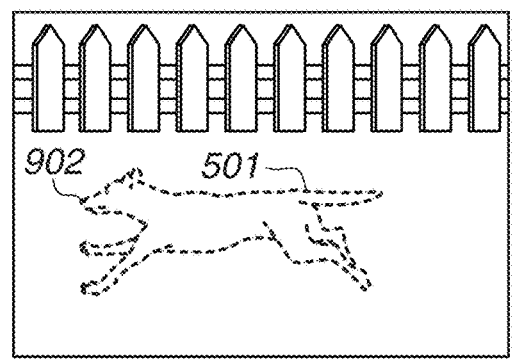

Next, a second display example where an edge of an object in which motion blur has occurred is displayed in an emphasized manner will be described with reference to FIGS. 7C and 7D. FIGS. 7C and 7D correspond to FIGS. 5B and 5C, respectively. A method for generating the motion blur notification image by displaying a motion blur edge in an emphasized manner will now be described.

The motion blur notification image generation unit 124 detects an edge strength in the preparatory captured image. A known method such as a Sobel filter is used to calculate the edge strength, and the description thereof is omitted. The motion blur notification image generation unit 124 extracts pixels where the edge strength is more than or equal to a predetermined value and the estimated motion blur is more than or equal to a predetermined value. Such a motion blur notification plane that displays the motion blur edge in an emphasized manner as indicated by 902 in FIGS. 7C and 7D is generated for the extracted pixels, and the motion blur notification plane is superimposed on the preparatory captured image, thus generating the motion blur notification image as illustrated in FIG. 7C. In the example of FIG. 7C, the motion blur edge is displayed as a thick line as indicated by 902.

In addition, as in in the first display example, the motion blur notification image generation unit 124 determines whether the state of motion blur in the target pixel is higher or lower than the appropriate panning speed based on a comparison result in step S406, and changes the degree of emphasis in edge emphasis depending on the determination result. For example, as illustrated in FIGS. 7C and 7D, in a case where the panning speed is higher (lower) than the appropriate panning speed, the motion blur edge is displayed as a thick solid line (dotted line).

In another example of the emphasis display method, pixels where the edge strength is more than or equal to the predetermined value and the estimated motion blur is more than or equal to the predetermined value are extracted and the extracted pixels are displayed with a color. In this case, the pixels may be displayed with different colors based on the comparison result of motion vectors.

In addition, regions in which motion blur is occurring, including a flat region in which the edge strength is less than the predetermined value, may be displayed in an emphasized manner Specifically, the motion blur notification image generation unit 124 performs the emphasis display in which pixels where the estimated motion blur for each pixel is more than or equal to the predetermined value are displayed with different colors depending on the direction of motion blur. The emphasis display is performed not only on the edge region, but also on regions other than the edge region, so that the entire object is displayed in an emphasized manner. This enables the user to more easily check the motion blur.

As a motion blur notification method, control processing in which the motion blur notification is not performed on a region where the direction of the motion vector for the image capturing apparatus 100 differs from the direction of the motion vector for the object by a predetermined angle or more may be performed. This enables facilitation of the display of the motion blur notification in the region of interest that is focused by the user and tacked by the image capturing apparatus 100 when panning is performed on objects that move in different directions between regions, such as the body and limbs of a running person. This configuration enables the user to easily check the motion blur in the region of interest.

Figure 7E:
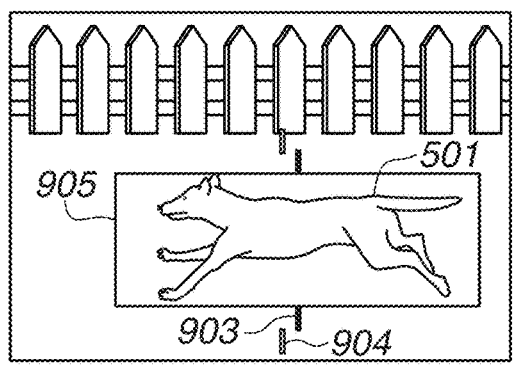
Figure 7G:
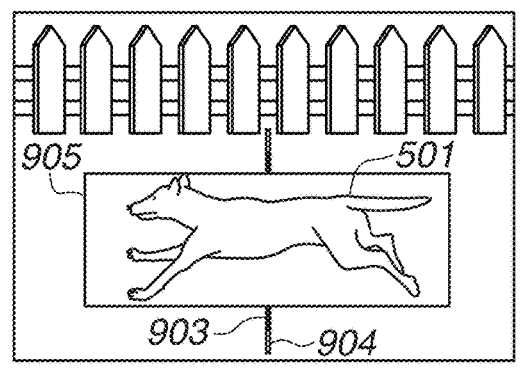
Figure 7F:
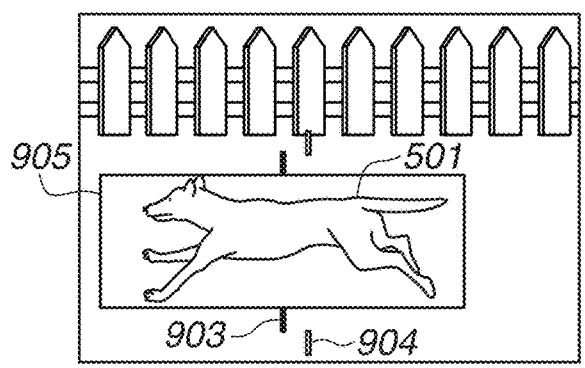

Next, a third display example where the degree of motion blur is displayed based on a positional relationship between icons will be described with reference to FIGS. 7E and 7F. FIGS. 7E and 7F correspond to FIGS. 5B and 5C, respectively.

The third display example includes a base icon 903 and a blur icon 904, and the degree of moving object blur during main image capturing is notified based on the positional relationship between the base icon 903 and the blur icon 904. For example, FIG. 7E illustrates a display example where the main object moves leftward from the right side of the screen, as in FIG. 5B, and the panning speed of the image capturing apparatus 100 is higher than the appropriate panning speed that matches the movement speed of the main object.

Whether a movement direction component of the object is a horizontal component or a vertical component with respect to a detection frame 905 of the main object or the like is determined, and the base icon 903 is disposed at the center on each side in a direction different from the movement direction (on upper and lower sides of the frame since the object is moving from right to left in the horizontal direction in FIG. 7E).

The blur icon 904 is disposed on the axis of the side in the movement direction of the object in which the base icon 903 is disposed. The blur icon 904 is disposed by setting the distance between the base icon 903 and the blur icon 904 such that the two icons have a direct proportional relationship for the size of the estimated motion blur using a predetermined proportionality coefficient.

In this case, the estimated motion blur may be represented as a distance between two icons. For example, the two icons may have a direct proportional relationship. The proportionality coefficient may be changed depending on the recording resolution.

FIG. 7F illustrates a case where the panning speed of the image capturing apparatus 100 is lower than the appropriate panning speed that matches the movement speed of the main object. In a case where the panning speed of the image capturing apparatus 100 is the appropriate panning speed that matches the movement speed of the main object, the base icon 903 and the blur icon 904 are displayed as illustrated in FIG. 7G. Thus, a main image capturing timing can be displayed based on the positional relationship between the base icon and the moving object blur icon without impairing the visibility of the main object, thus making it possible to assist an intuitive operation.

As an expression for a moving object blur amount using the moving object blur icon, the moving object blur amount may be expressed with the size of a shape or a color variation, in addition to the positional relationship between the moving object blur icon and the base icon. The motion blur notification image generation processing performed by the motion blur notification image generation unit 124 has been described above.

The present exemplary embodiment described above illustrates three display examples, i.e., the motion blur frame display, the motion blur edge emphasis display, and the motion blur icon positional relationship display, as the motion blur notification method. However, the motion blur notification method is not limited to these examples.

The motion blur notification may be displayed by switching the above-described display examples depending on the image capturing scene or the image capturing mode. For example, if a high priority is to be given to the visibility of the main object as in the case of panning, the third display example may be used, and if the blur in the main object is to be checked in more detail, the second display example may be used.

The display examples may be switched depending on the resolution of the recording image to be captured. In addition to the motion blur notification described above, the blur to be corrected with the motion blur correction function may be displayed in a distinguishable manner.

As described above, according to the present exemplary embodiment, the motion blur estimated during main image capturing can be notified during preparatory image capturing. This enables the user to more intuitively check the degree of object blur and whether the image capturing apparatus 100 can track the object at an appropriate speed during preparatory image capturing.

While the present exemplary embodiment described above illustrates an example where the motion blur notification is displayed on the display unit 117 as a motion blur notification method, the motion blur notification method is not limited to this example. For example, the motion blur may be notified with sound. Specifically, in a case where the ratio of the number of pixels indicating the estimated motion blur that is more than or equal to the predetermined value in the estimated motion blur for each pixel to the entire screen is more than or equal to a predetermined ratio, a motion blur notification sound may be generated. In addition, the notification sound to be generated may be changed based on a result of comparison between motion blur directions.

The estimated motion blur in main image capturing estimated by the motion blur estimation unit 123 may be recorded in association with the main captured image as a motion blur log. For example, the estimated motion blur that has occurred nearest in time to receiving of the image capturing instruction, or during a predetermined period may be recorded as the motion blur log. The motion blur log may also be used as rating information for emphasis display of the motion blur during playback of the captured image, or for image selection based on the blur.

Next, another configuration example of the present exemplary embodiment in which the image capturing apparatus performs a motion blur correction during main image capturing will be described. FIG. 8 is a block diagram illustrating a second configuration example of the present exemplary embodiment. The second configuration example will be described below.

A second image capturing apparatus 800 includes therein a motion blur correction mechanism in addition to the components of the image capturing apparatus 100. Descriptions of components similar to those of the image capturing apparatus 100 are omitted, and the differences will be described below. The second image capturing apparatus 800 is connected to the optical system 101 and performs image capturing, as in the above-described first configuration example. If the optical system 101 includes the correction lens 103, an optical blur correction control may be performed in cooperation with the second image capturing apparatus 800.

For example, in the case of performing a blur correction with a blur correction amount that is more than or equal to the correction amount of blur that can be corrected by the second image capturing apparatus 800, control processing for causing the optical system 101 to perform the blur correction control may be performed. Alternatively, the processing may be shared such that, for example, a manual blur correction during preparatory image capturing or a high-frequency blur correction may be performed in the optical system 101 so that the motion blur correction during main image capturing can be easily implemented by the image capturing apparatus 800.

A blur correction control unit 801 drives the image sensor of the image capturing unit 114, thus implementing the optical blur correction function. Specifically, the blur correction control unit 801 calculates the driving amount of the image sensor in main image capturing using motion information acquired by the motion vector calculation unit 122 and/or the motion detection unit 119 during preparatory image capturing, and outputs motion blur correction information obtained by the image sensor to the RAM 113 and/or the blur correction information acquisition unit 121. Examples of the blur correction information obtained by the image sensor include information about the driving amount and the direction in which the image sensor is driven in the direction vertical to the optical axis. The mathematical expressions for the image sensor driving amount in main image capturing are similar to Expressions (3) and (4) in the motion blur correction function of the optical system 101 described above. During main image capturing, the image sensor of the image capturing unit 114 is driven with the image sensor driving amount in main mage capturing described above, thus implementing the motion blur correction function.

The second configuration example differs from the first configuration example in that the motion blur correction information acquired by the blur correction information acquisition unit 121 in step S206 is acquired by the blur correction control unit 801.

Other Exemplary Embodiments

Beneficial effects of the disclosure can also be produced as follows. A storage medium storing a program code of software in which a procedure for implementing functions according to the above-described exemplary embodiments is described is supplied to a system or an apparatus. A computer (or a CPU, a micro processing unit (MPU), etc.) of the system or the apparatus reads out and executes the program code stored in the storage medium.

In this case, the program code read out from the storage medium implements new functions of the aspect of the embodiments, and the storage medium storing the program code and program constitute the aspect of the embodiments.

Examples of the storage medium for supplying the program code include a flexible disk, a hard disk, an optical disk, and a magneto-optical disk. A compact disc (CD)-ROM, a CD-Recordable (R), CD-ReWritable (RW), a Digital Versatile Disk (DVD)-ROM, a DVD-RAM, a DVD-RW, a DVD-R, a magnetic tape, a nonvolatile memory card, a ROM, and the like can also be used.

The functions according to the above-described exemplary embodiments are implemented by executing the program code read out by the computer. Further, based on instructions from the program code, some or all of the actual processes may be performed by an operating system (OS) or the like running on the computer, and the functions according to the above-described exemplary embodiments may be implemented by the processes.

The aspect of the embodiments also includes the following case. Initially, the program code read out from the storage medium is written into a memory included in a function expansion board in the computer, or into a memory in a function expansion unit connected to the computer. After that, in accordance with instructions from the program code, some or all of the actual processes are performed by a CPU or the like included in the function expansion board or the function expansion unit.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2021-021951, filed Feb. 15, 2021, and No. 2022-013180, filed Jan. 31, 2022, which are hereby incorporated by reference herein in their entirety.

What is claimed is:

1. An apparatus comprising at least one processor and memory coupled to the processor storing instructions that when executed by the processor, causes the processor function as:
   a capturing unit configured to capture an object image formed through an optical system;
   a first acquisition unit configured to acquire a first captured image and first information indicating a motion of an object in the first captured image, the first captured image being obtained by first capturing with a first parameter;
   a second acquisition unit configured to acquire second information indicating a motion of the apparatus in the first capturing;
   a setting unit configured to set a second parameter;
   a third acquisition unit configured to acquire driving information for either the optical system or the capturing unit;
   an estimation unit configured to estimate estimated information by converting motion blur of the object in the first captured image into motion blur of the object in a second captured image obtained in a case where second capturing is performed with the second parameter; and
   a notification unit configured to notify the estimated information.

2. The apparatus according to claim 1, wherein the estimation unit estimates the estimated information using the first information, the second information, the second parameter, and the driving information.

3. The apparatus according to claim 1,
   wherein the optical system includes a correction lens and a first control unit configured to control driving of the correction lens in a direction vertical to an optical axis, and
   wherein the first control unit controls driving of the correction lens using driving information calculated with the second information and the second parameter, and the third acquisition unit communicates with the optical system to acquire the driving information for the correction lens.

4. The apparatus according to claim 1,
   wherein the capturing unit includes a second control unit configured to control driving of a sensor in a direction vertical to an optical axis,
   wherein the second control unit controls driving of the sensor using driving information calculated with the second information, the second parameter, and the driving information for the correction lens, and
   wherein the third acquisition unit communicates with the second control unit to acquire driving information for the sensor.

5. The apparatus according to claim 1, wherein the driving information includes at least information about a driving amount and a driving direction.

6. The apparatus according to claim 1, wherein the at least one processor further functions as a calculation unit configured to calculate the motion information by comparing a plurality of the first captured images,
   wherein a blur amount converted into the motion blur of the object in the second captured image is estimated by subtracting a correction amount obtained based on the driving information from the estimated information before correction in the second capturing, and the estimated information has been calculated through conversion of the motion information, a time interval between images in a plurality of the first capturings, and an exposure time set as the second parameter.

7. The apparatus according to claim 6, wherein the at least one processor further functions as a determination unit configured to determine whether the driving information is to be used for the estimation unit,
   wherein the estimation unit switches an estimation process depending on a result of the determination made by the determination unit.

8. The apparatus according to claim 7, wherein the determination unit determines whether to use the driving information for the estimation unit depending on a mode of the apparatus.

9. The apparatus according to claim 8, wherein the determination unit determines whether to use the driving information for the estimation unit depending on the presence or absence of a correction lens and a driving control unit of the optical system.

10. The apparatus according to claim 7, wherein the determination unit determines whether to use the driving information for the estimation unit depending on a movement direction of the apparatus.

11. The apparatus according to claim 1, wherein the second capturing is main capturing and the first capturing is preparatory capturing to be performed before the main capturing.

12. The apparatus according to claim 1, wherein the at least one processor further functions as a display unit configured to display and notify the estimated information.

13. The apparatus according to claim 12, wherein the notification unit notifies motion blur by displaying an image representing a frame on the display unit.

14. The apparatus according to claim 12, wherein the notification unit notifies motion blur by displaying an image representing a motion blur edge in an emphasized manner on the display unit.

15. The apparatus according to claim 12, wherein the notification unit notifies motion blur by displaying an image representing a positional relationship between a base icon and an icon on the display unit.

16. The apparatus according to claim 12, wherein the notification unit notifies motion blur and blur to be corrected through correction in a distinguished manner.

17. The apparatus according to claim 12, wherein a notification mode and a degree of emphasis are switched depending on a capturing mode and a recording resolution of the apparatus.

18. The apparatus according to claim 12, wherein the notification unit notifies motion blur during the first capturing.

19. The apparatus according to claim 1, further comprising a generation unit configured to generate a notification sound,
   wherein the notification unit notifies motion blur with sound.

20. The apparatus according to claim 1, wherein the second capturing is at least still capturing.

21. A method for an apparatus including a capturing unit configured to capture an object image formed through an optical system, the method comprising:
  acquiring, as a first acquiring, a first captured image and first information indicating a motion of an object in the first captured image, the first captured image being obtained by first capturing with a first parameter;
  acquiring, as a second acquiring, second information indicating a motion of the apparatus in the first capturing;
  setting a second parameter;
  acquiring driving information for either the optical system or the capturing unit;
  estimating estimated information by converting motion blur of the object in the first captured image into motion blur of the object in a second captured image obtained in a case where second capturing is performed with the second parameter; and
  notifying the estimated information.

22. A non-transitory computer-readable storage medium storing a program for causing a computer to execute each process of a method for an apparatus including a capturing unit configured to capture an object image formed through an optical system, the method comprising:
  acquiring, as a first acquiring, a first captured image and first information indicating a motion of an object in the first captured image, the first captured image being obtained by first capturing with a first parameter;
  acquiring, as a second acquiring, second information indicating a motion of the apparatus in the first capturing;
  setting a second parameter;
  acquiring driving information for either the optical system or the capturing unit;
  estimating estimated information by converting motion blur of the object in the first captured image into motion blur of the object in a second captured image obtained in a case where second capturing is performed with the second parameter; and
  notifying the estimated information.

* * * * *